United States Patent
Arndt et al.

(10) Patent No.: US 11,400,857 B2
(45) Date of Patent: Aug. 2, 2022

(54) METHOD FOR OPERATING A HIGH-BEAM ASSISTANCE SYSTEM OF A MOTOR VEHICLE

(71) Applicant: FORD GLOBAL TECHNOLOGIES, LLC, Dearborn, MI (US)

(72) Inventors: Christoph Arndt, Moerlen (DE); Frederic Stefan, Aachen (DE); Anke Dieckmann, Bad Marienberg / Eichenstruth (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/392,455

(22) Filed: Aug. 3, 2021

(65) Prior Publication Data
US 2022/0041096 A1 Feb. 10, 2022

(30) Foreign Application Priority Data
Aug. 5, 2020 (DE) .......................... 102020120713.1

(51) Int. Cl.
| | |
|---|---|
| *B60Q 1/14* | (2006.01) |
| *B60Q 1/08* | (2006.01) |
| *G06V 10/56* | (2022.01) |
| *G06V 10/60* | (2022.01) |
| *G06V 20/58* | (2022.01) |

(52) U.S. Cl.
CPC .............. *B60Q 1/143* (2013.01); *B60Q 1/085* (2013.01); *G06V 10/56* (2022.01); *G06V 10/60* (2022.01); *G06V 20/584* (2022.01); *B60Q 2300/42* (2013.01)

(58) Field of Classification Search
CPC .. B60Q 2300/42; B60Q 1/143; G06V 20/584; G06V 10/60
See application file for complete search history.

(56) References Cited

U.S. PATENT DOCUMENTS

| | | | |
|---|---|---|---|
| 8,218,009 B2 | 7/2012 | Heinrich et al. | |
| 8,605,154 B2 * | 12/2013 | Datta ..................... | B60Q 1/143 348/148 |
| 9,227,553 B2 | 1/2016 | Nordbruch | |
| 9,566,900 B2 | 2/2017 | Schmidt et al. | |
| 9,721,172 B2 | 8/2017 | Wright et al. | |
| 2017/0345164 A1 | 11/2017 | Guerreiro et al. | |

* cited by examiner

*Primary Examiner* — Robert J May
(74) *Attorney, Agent, or Firm* — Frank L. Lollo; MacMillan, Sobanski & Todd, LLC

(57) ABSTRACT

A high-beam assistance system of a motor vehicle determines whether or not an unseen vehicle with headlamps switched on is approaching from the opposite direction before the unseen vehicle enters the field of view of a camera in the host vehicle. Wherein the registered images do not include any approaching vehicle on the roadway, the high-beam assistance system determines an expected illumination information item which is estimated to result from illumination by the host headlamps, determines an actual illumination information item contained in the registered images, and compares the expected illumination information item and the actual illumination information item. If the actual illumination information item deviates from the expected illumination information item, then the illumination provided by the host headlamps is adjusted from a high-beam state to a low-beam state.

16 Claims, 1 Drawing Sheet

METHOD FOR OPERATING A HIGH-BEAM ASSISTANCE SYSTEM OF A MOTOR VEHICLE

CROSS REFERENCE TO RELATED APPLICATIONS

This application claims priority to application 102020120713.1, filed in the German Patent and Trademark Office on Aug. 5, 2020, which is incorporated herein by reference in its entirety.

STATEMENT REGARDING FEDERALLY SPONSORED RESEARCH

Not Applicable.

BACKGROUND OF THE INVENTION

The invention relates to a method for operating a high-beam assistance system of a motor vehicle, wherein a region which is arranged in front of the motor vehicle in a forward driving direction and illuminated by means of headlamps of the motor vehicle is registered continuously by at least one camera of the motor vehicle, and wherein the high-beam assistance system is operated while taking into account images registered by means of the camera. The invention furthermore relates to a motor vehicle having headlamps by means of which a region which is arranged in front of the motor vehicle in a forward driving direction of the motor vehicle during driving of the motor vehicle can be illuminated, a high-beam assistance system by means of which the headlamps can be selectively switched to a high-beam state or at least one low-beam state, and at least one camera by means of which the region illuminated by means of the headlamps can be registered continuously, wherein the high-beam assistance system can be operated while taking into account images registered by means of the camera.

Currently, many motor vehicles are equipped with high-beam assistance systems for automatically adapting light emitted by headlamps of the motor vehicles, for example in order to be able to produce dazzle-free high-beam light or a similar technique. Such techniques use a camera with which a region (which is arranged in front of the motor vehicle in a forward driving direction of a motor vehicle during driving of the motor vehicle and is illuminated by means of the headlamps of the motor vehicle) is registered continuously.

Processing devices have been used to evaluate the images of such a camera in order to search for objects (e.g., a motor vehicle, a truck or another land vehicle) on a roadway (e.g., paved or unpaved streets, avenues, highways, parking areas) lying in front of the motor vehicle. This means that the camera must "see" an object in order to be able to register and classify it, and in order to be able to make a decision whether, for example, it is necessary to change from a high-beam state of the headlamps to a low-beam state of the headlamps. To this end, the object must be contained in an image recorded by the camera and in a particular registering region of the image.

A disadvantage is that known algorithms require a certain time in order to verify the identified object. This is because it is important to prevent a rapidly repeating change between the high-beam state of the headlamps and the low-beam state of the headlamps due to uncertainties or false-positive results.

This verification has resulted in delaying the change from the high-beam state to the low-beam state, so that drivers of oncoming vehicles may receive dazzling light. Furthermore, bends and crests in roads may lead to undesirable dazzling since the registering, identification and verification of an oncoming other vehicle takes a certain amount of time and activation of the low-beam state of the headlamps takes place later than desired, and in particular does not begin directly when the oncoming traffic enters a field of view of the camera.

When two motor vehicles approach a bend or crest from opposite directions, one motor vehicle enters the field of view of the camera of the other motor vehicle only after a certain proximity of the motor vehicles. Therefore, for a high-beam assistance system of the latter motor vehicle, before reaching this proximity it is not possible to change automatically from the high-beam state to a low-beam state. Other automatic light regulators, for example for a matrix light or the like, also do not carry out changes in this situation. The only change of the light may be adaptation of the light emission to the respective road curvature. After reaching the aforementioned proximity of the motor vehicles, one motor vehicle enters the field of view of the camera of the other motor vehicle. At this time, however, and for the period of time until verification of the former motor vehicle, the headlamps of the latter motor vehicle are still in the high-beam state, so that the driver of the former motor vehicle is dazzled until the headlamps are switched to the low-beam state after verification of the former motor vehicle. Even if the algorithm of the high-beam assistance system of the motor vehicle that has the camera were to be combined with mapping data that contain information about the bend, the essential part of the algorithm is based on the information generated by the camera. The former motor vehicle must therefore be in the field of view of the camera of the latter motor vehicle for a certain period of time in order to allow the algorithm to be able to identify the presence of an oncoming motor vehicle. In this case, a camera image usually consists of different segments which are used for different algorithms. For example, it may be provided that the oncoming motor vehicle must first enter that segment of a camera image that is used for the high-beam assistant.

U.S. Pat. No. 9,721,172 B2 discloses an imaging system for a vehicle, which comprises an image detector that is configured to image a scene outside and in front of the vehicle and to generate image data that correspond to the registered images. A controller is configured to receive the image data, and to analyze an optical flow between successive image frames in order to calculate a relative movement between the image detector and the imaged scene, the optical flow containing a pattern of an apparent movement of objects of interest in the successive image frames.

Published US patent application 2017/0345164A1 discloses an identification system for a motor vehicle, which comprises a computation unit having a first input connection for receiving data from a camera looking forward, a second input connection for receiving data from a right camera looking sideways, a third input connection for receiving data from a left camera looking sideways, and a fourth input connection for receiving data from a camera looking backward. The computation unit comprises a processing unit for obtaining a first sequence of consecutive images from the camera looking forward, a second sequence of consecutive images from the left camera looking sideways, a third sequence of consecutive images from the right camera looking sideways, and a fourth sequence of consecutive images from the camera looking backward, for merging the first sequence of consecutive images, the second sequence of consecutive images, the third sequence of consecutive images and the fourth sequence of consecutive images, in order to obtain a sequence of merged images, for providing a virtual projection of the images of the sequence of merged images onto a ground plane by using an affine projection and thereby obtaining a sequence of projected images, for ascertaining an optical flow on the basis of the sequence of projected images, the optical flow comprising motion vectors of target objects in the environment of the vehicle. An ego-motion of the vehicle (e.g., position and movement relative to other fixed and moving objects in an environment) is ascertained on the basis of the optical flow, and a kinematic state of the vehicle is predicted on the basis of the ego-motion.

U.S. Pat. No. 9,566,900B2 discloses a driver assistance system for automatic control of a light source on a vehicle, having a camera and an image evaluation unit which is configured to search, in images delivered by the camera, for first bright zones which represent a switched-on vehicle headlamp and to switch the light source off when identifying both a first bright zone and a second bright zone which is larger and less bright than the representation of a switched-on vehicle headlamp.

U.S. Pat. No. 9,227,553B2 discloses a method for adjusting illumination, in particular of headlamps, for a vehicle, having a first step in which a bend lying in front is identified and its visibility is determined, the visibility representing the possibility of dazzling, in particular of other road users, in particular of oncoming traffic, and having a second step of adjusting the illumination between least possible dazzling and best possible illumination. The adjustment is carried out as a function of the visibility.

U.S. Pat. No. 8,218,009B2 discloses a method for identifying and categorizing light points for a vehicle having a camera sensor directed into the vehicle surroundings. The method provides at least one first category for stationary irradiated reflectors and at least one second category for self-radiating moving lights, in particular vehicle lights, an image sequence of the vehicle surroundings being recorded, at least one light point in the image sequence being tracked, the intensity of a tracked light point in at least two images being ascertained and the time profile of the intensity being analyzed, and light points having a comparatively high intensity variation being categorized as vehicle lights and light points having a comparatively low intensity variation being categorized as reflectors.

SUMMARY OF THE INVENTION

An object of the invention is to prevent dazzling of oncoming traffic and to increase driving comfort.

According to the invention, these and other objects are achieved by methods and apparatus according to which a camera is used to electronically determine whether at least one illumination information item, which does not result from the illumination of the region by means of the host vehicle's headlamps, is contained in the images registered by means of the camera.

It should be pointed out that the features and measures mentioned individually in the following description may be combined with one another, and may represent further configurations of the invention, in any desired technically feasible way. The description additionally characterizes and specifies the invention particularly in conjunction with the figures.

According to the invention, it is possible to establish whether or not an unseen vehicle with headlamps switched on is approaching the host motor vehicle (also referred to as the ego vehicle) from the opposite direction, before the unseen vehicle enters the field of view of the camera of the host motor vehicle, by the images registered by means of the camera being electronically analyzed in respect of whether at least one illumination information item, which does not result from the illumination of the region by means of the headlamps of the host vehicle, is contained in them. In this case, an illumination information item is intended to mean an information item which is contained in the images of the camera and which is generated by illumination of a region of the field of few of the camera by means of the headlamps of the unseen, oncoming vehicle. The illumination information item is thus an optical or optically perceptible image data or property, specifically one which does not result exclusively from the illumination of the region by means of the headlamps of the host motor vehicle (in other words, which results at least partly from illumination by a unseen vehicle).

The assessment of whether or not an illumination information item contained in the images recorded by the camera results from illumination of the region by means of the headlamps of the host motor vehicle or by means of the headlamps of an oncoming vehicle may, for example, be carried out while taking into account at least one electronically precalculated illumination information item which results from the illumination of the region by means of the headlamps of the host motor vehicle, on the basis of known or predetermined and/or sensor-registered properties or parameters of the host motor vehicle and as a function of a comparison outcome of the illumination information item contained in the images recorded by the camera with the precalculated illumination information item. If the former deviates from the latter, it may be deduced that the illumination information item contained in the images recorded by the camera does not result solely from the illumination of the region by means of the headlamps of the host motor vehicle. Correspondingly, two or more, in particular different, illumination information items contained in the images recorded by the camera may also be compared with two or more, in particular different, precalculated illumination information items.

As an alternative or in addition, the assessment of whether or not the illumination information item contained in the images recorded by the camera results from the illumination of the region by means of the headlamps of an unseen motor vehicle may, for example, be carried out while taking into account at least one predetermined or known illumination information item which results from the illumination of the region by means of the headlamps of the host motor vehicle, and as a function of a comparison outcome of the illumination information item contained in the images recorded by the camera with the predetermined or known illumination information item. If the former deviates from the latter, it may be deduced that the illumination information item contained in the images recorded by the camera does not result solely from the illumination of the region by means of the headlamps of the host motor vehicle. Correspondingly, two or more, in particular different, illumination information items contained in the images recorded by the camera may also be compared with two or more, in particular different, predetermined or known illumination information items.

The region which is respectively arranged in front of the host motor vehicle in the forward driving direction of the motor vehicle during driving of the motor vehicle is illuminated by means of the front headlamps of the host motor vehicle. The region may in this case be merely a part of an image generated by means of the camera, so that the camera image also comprises at least one further image region besides the region.

The camera may, for example, be installed on a windshield of the host motor vehicle. The high-beam assistance system may be activated in order to switch the headlamps of the host motor vehicle in an automated fashion from their high-beam state to their low-beam state. In addition, the high-beam assistance system may also be configured to vary light cones emitted by the headlamps in a different way in a high-beam state of the headlamps in order to prevent dazzling of the oncoming traffic. The method steps mentioned below may be carried out individually or in a combination of at least two of these method steps with one another by means of the high-beam assistance system, even though this is not explicitly mentioned in many passages. The motor vehicle may, for example, be an automobile or a truck or another type of utility vehicle.

The high-beam assistance system, or the evaluation electronics thereof, may include a trained processor. In particular, it is possible to confirm manually via a man-machine interface of the host motor vehicle when the high-beam assistance system has reliably detected an oncoming vehicle before it enters the field of view of the camera. In this way, it is possible that the trained high-beam assistance system can react even earlier in the event of detection of a similar illumination information item, which does not result solely from the illumination of the region by means of the headlamps of the host motor vehicle, which is equivalent to tuning of the high-beam assistance system. This tuning is very effective for standard routes traveled. As an alternative or in addition, the illumination information items which do not result solely from the illumination of the region by means of the headlamps of the host motor vehicle may be collected in a cloud so as to obtain a basic set of data. The properties and performance of the motor vehicle's own light may be trained by means of an algorithm during driving of the motor vehicle, in order also to be able to adapt the high-beam assistance system to variations which occur because of dust, fog, rain, time of day, season of the year, and the like.

If it is determined by means of the high-beam assistance system that another vehicle is approaching from the opposite direction, before the other vehicle enters the field of view of the motor vehicle, the light projection pattern from the host motor vehicle is adjusted by means of the high-beam assistance system in order to prevent dazzling of the driver(s) of oncoming traffic. For the decision of the high-beam assistance system as to whether it is necessary to switch from a high-beam state to a low-beam state, a local information item, which is for example obtained from map data or from camera data relating to the landscape, may also be taken into account by the high-beam assistance system. Furthermore, environmental information items, for example whether the motor vehicle is approaching a crest, whether it is raining, there is fog, or the like, may be taken into account for this decision.

In the case of a crest lying ahead, the light cones of an oncoming other vehicle are already visible before the other vehicle reaches the crest and enters the field of view of the camera of the motor vehicle. By means of the high-beam assistance system, however, it is possible to use and evaluate light reflections in the surroundings in order to register the approach of another vehicle before the other vehicle comes into the field of view of the camera of the host motor vehicle, so as to be able to change the light distribution of the headlamps of the host motor vehicle early in such a way that dazzling of the oncoming traffic can be reliably prevented. In this case, the surroundings are used so to speak as a projection surface.

According to one advantageous configuration, whether a color of light (e.g. a light spectrum) which does not match a light color or spectrum generated by means of the headlamps is contained in the images registered by means of the camera is electronically determined. A light color, in particular a spectral color distribution, a light temperature, and/or a light frequency component, in the camera images which are generated by means of the headlamps of the host motor vehicle, is usually known and may be stored as a predetermined or known illumination information item in an electronic memory of the high-beam assistance system. As a function of a comparison outcome of the illumination information item contained in the images recorded by the camera with the predetermined or known illumination information item, it is possible to deduce whether or not the illumination information item contained in the images recorded by the camera results from the illumination of the region solely by means of the headlamps of the host motor vehicle. If for example, the illumination information item contained in the images recorded by the camera deviates by a predetermined amount from the predetermined or known illumination information item, it may be deduced that the illumination information item contained in the images recorded by the camera results not only from the illumination of the region by means of the headlamps of the host motor vehicle but also includes a contribution from illumination of the region by means of headlamps of an oncoming, unseen motor vehicle. In this case, an algorithm of the high-beam assistance system may be configured to register the light color of one or more pixels of an image recorded by the camera. If the brightness of a plurality of pixels is registered, these may be considered and evaluated as a set of pixels, or as a pixel cloud. If such a pixel cloud has a light color which is not generated by the light emerging from the headlamps of the motor vehicle, the pixel cloud may for example be identified as an extraneous, or new, pattern, the presence of which allows the approach of another vehicle to be deduced. Such pixel clouds may be identified easily by means of known methods or algorithms, and they make a direct reaction of the high-beam assistance system possible.

According to a further advantageous configuration, whether a movement of correlated pixels, which is determined from the images registered by means of the camera, deviates from a setpoint movement of pixels which is to be expected on the basis of a movement of the motor vehicle is electronically determined. The setpoint movement of pixels which is to be expected on the basis of a movement of the motor vehicle may be determined by means of a method or algorithm, which is preferably supplied with information items relating to the existing driving dynamics of the motor vehicle. For example, an algorithm may be configured to extrapolate the setpoint movement of pixels which is to be expected from the information items relating to the existing driving dynamics of the motor vehicle. The movement direction of the pixels (e.g., sets of pixel values representing an object or illumination item that is tracked according to a sequence of images) may in this case be derived from a theoretical model that, in particular, contains information items relating to the motor vehicle and relating to the light cone/s of the motor vehicle. In particular, the light cones emitted by the headlamps of the host motor vehicle and their extent are known. This knowledge may be trained in a quasi-static mode, for example when the motor vehicle is in a parking lot or another type of large area. The light cones, or their extent, may be varied situation-dependently. These various light cones, or light cone extents, are also known to the high-beam assistance system. The properties of the host motor vehicle's own light are thus known to the high-beam assistance system at any time. From the driving dynamics of the motor vehicle, the movement of the motor vehicle's own light in the respective driving situation may then be ascertained by means of the high-beam assistance system. In this case, the motor vehicle's own light is intended to mean its own light distribution over its entire extent, which begins forward in front of the motor vehicle, has lateral outer edges and ends very far forward in front of the vehicle. A movement of pixels may be characterized by a movement speed and/or a movement direction of the pixels. For the determination of the setpoint movement of the pixels, additional information items may be taken into account, for example map data and/or environmental information items, for instance whether it is raining, whether there is fog, whether it is snowing, whether there is dust, whether the road is icy, or the like. The movement of the pixels which deviates from the setpoint movement in the images recorded by means of the camera represents an illumination information item which does not result from the illumination of the region by means of the headlamps of the motor vehicle (i.e., does result from illumination by another source such as headlamps of an unseen vehicle).

All objects which are illuminated by the headlamps of the host motor vehicle and are located in the field of view of the camera generate a particular pattern, for example in the form of a set of pixels or a pixel cloud, in the images recorded by means of the camera, with such pixels all moving in the same direction. In addition, a light distribution of the pixels may be determined. The movement of this pattern in the images recorded by means of the camera is ascribed to the movement of the host motor vehicle. In this case, a pattern which moves as a function of a movement of the host motor vehicle may be defined in the images. These movements of the pattern may be monitored, or tracked, by means of the camera and an associated algorithm. To this end, an algorithm determines an optical flow within the images, or can monitor or track the movement of at least a particular image region or a particular pixel cloud. Together with the registered movement of the motor vehicle, it is possible to determine a setpoint movement of pixels which is to be expected on the basis of the movement of the motor vehicle. These pixels may also form a pattern that is electronically monitored, or tracked. This monitoring may be adapted, trained, or optimized in phases in which the motor vehicle is the only vehicle on a road or in an area, so that the only pattern in the images recorded by means of the camera is due to the motor vehicle. All these situations allow optimization, or adaptation, of the monitoring algorithm. By means of an algorithm, it is furthermore also possible for a stationary object, which is contained in the camera images and which reflects, or generates, the pattern generated in the images by the headlamps, to be registered. Changes in a light mode of the light emitted by means of the headlamps of the motor vehicle are preferably likewise known and may be taken into account by the algorithm in order to prevent flickering of the headlamps between the high-beam state and the low-beam state.

If the host motor vehicle and an unseen, oncoming other vehicle are approaching a common bend, the switched-on headlamps of the other vehicle generate a separate (non-host) light pattern in the field of view of the camera of the host motor vehicle, specifically before the other vehicle has entered the field of view of the camera. The non-host light pattern is formed by a set of pixels, or a pixel cloud, these pixels moving in a different way than pixels of a pattern which exists in the field of view of the camera and which is generated by the illumination of the region by means of the headlamps of the host motor vehicle. This difference may be identified by means of an algorithm, so that the algorithm can establish that the other vehicle is approaching from the opposite direction even though the other vehicle is still outside the field of view of the camera. In this way, the high-beam assistance system can switch from a high-beam state to a low-beam state before the other vehicle enters the field of view of the camera. It is thus possible to reliably prevent a driver of the oncoming other vehicle from being dazzled by the motor vehicle. Pixels which are caused by a stationary unseen vehicle differ from pixels which are generated by the host motor vehicle in that the latter move but the former do not, which can also be identified by means of the high-beam assistance system.

The monitoring of movement of pixel patterns may be improved by combining the registered optical flow of pixels with co-registration algorithms which analyze similarities between successive camera images. Such algorithms are known from stereoscopic image processing or from interferometry, for example in conjunction with synthetic aperture radar (SAR). In SAR, these algorithms are applied to two images of two different sensors. In the scope of the present invention, such algorithms may be used for two successive images which are recorded over time by means of a single sensor, namely by means of the camera. Such algorithms allow superposition of the images and assessment of the differences between the images, that is to say monitoring of the two pixel clouds which are respectively generated by the host motor vehicle and the other, unseen vehicle. This is useful in particular since the entire scenario in the camera images changes during a journey. Since the optical flow reacts to the changes in the images, it may be helpful to determine the differences in the images which are caused by movement of the motor vehicle by additional algorithms. This reduces the number of changing pixels and allows even more accurate registering of oncoming traffic. One possible algorithm is, for example, a random sample consensus (RANSAC) algorithm.

According to a further advantageous configuration, the movement of the motor vehicle is electronically determined by means of a vehicle sensor system, and/or the setpoint movement of the pixels is electronically determined from the movement of the motor vehicle. By means of the vehicle sensor system, the motor vehicle's a yaw rate, a longitudinal acceleration, a transverse acceleration, a steering-wheel angle, or the like, can be registered. It is also possible for two or more of these registered quantities to be used for the electronic determination of the setpoint movement of the pixels that results from the movement of the motor vehicle.

According to a further advantageous configuration, whether a brightness existing outside the region illuminated by means of the headlamps of the host vehicle exceeds a predetermined brightness limit value is electronically determined. If the brightness existing outside the region illuminated by means of the headlamps exceeds the predetermined brightness limit value, this is an indication that another vehicle with headlamps switched on may be approaching from the opposite direction. In addition to the region illuminated by means of the headlamps of the host motor vehicle, the images recorded by means of the camera contain the image region which lies outside this region and the brightness of which may be monitored in order to be able to establish whether or not the respective brightness existing outside the region illuminated by means of the headlamps exceeds the predetermined brightness limit value. The brightness outside the region illuminated by means of the headlamps of the host motor vehicle already increases when the other vehicle is approaching from the opposite direction, before the other vehicle enters the field of view of the camera of the host motor vehicle. The brightness outside the region illuminated by means of the headlamps of the host motor vehicle represents an illumination information item which does not result from the illumination of the region by means of the headlamps of the host motor vehicle.

According to a further advantageous configuration, the brightness limit value is varied as a function of an ambient brightness. In this way, the sensitivity of the high-beam assistance system may be adapted automatically to the respective ambient brightness. If the host motor vehicle is driving in a relatively dark environment, the brightness limit value may be reduced, while the brightness limit value may be increased in brighter surroundings. Relatively dark surroundings may for example be the case when driving on an unlit country road, a forest track, or the like.

According to a further advantageous configuration, whether or not a brightness of the region illuminated by means of the headlamps changes is electronically determined. Such a brightness change of the region illuminated by means of the headlamps of the host motor vehicle is also an indication of the approach of another vehicle with headlamps switched on from the opposite direction, the brightness of the region illuminated by means of the headlamps already changing before the other vehicle enters the field of view of the camera of the host motor vehicle. A corresponding brightness change of the region illuminated by means of the headlamps of the host motor vehicle represents an illumination information item which does not result from the illumination of the region by means of the headlamps of the host motor vehicle.

According to a further advantageous configuration, whether or not illumination of an object which is registered by means of the camera and is arranged in the region illuminated by means of the host vehicle's headlamps deviates from an expected illumination of the object by means of the headlamps is electronically checked. Pixel clouds relating to the motor vehicle's own light on the one hand and the extraneous light of the other vehicle on the other hand differ in that the objects are irradiated, or illuminated, on different surfaces by the host motor vehicle and by the other vehicle. In this case, there may be a direct reflection of the own light and a deflected reflection of the extraneous light. Furthermore, surfaces of the objects which the host vehicle's light cannot irradiate may be irradiated by extraneous light, possibly with a movement pattern, and this may be recognized by means of a suitable algorithm. Typical patterns in the camera images are, for example, formed by guardrails irradiated with the host vehicle's light. In this respect, the high-beam assistance system may be trained, for example by taking a host's light pattern, formed during the irradiation of guardrails with the host' s light, as input into a neural network of the high-beam assistance system. An environmental geometry, in particular a road geometry, for instance a bend, a bend radius, a slope or other gradients may also be used as input for a neural network of the high-beam assistance system, in order to map visible light patterns. A deviation of the illumination of an object, which is registered by means of the camera and is arranged in the region illuminated by means of the host headlamps, from an expected illumination of the object by means of the headlamps of the host motor vehicle alone represents an illumination information item which does not result from the illumination of the region by means of the headlamps of the host motor vehicle.

According to a further advantageous configuration, whether the host motor vehicle is driving up a hill is electronically determined, and then, if at least one illumination information item, which does not result from the illumination of the region by means of the host headlamps, is contained in the images registered by means of the camera, the headlamps are operated in such a way that the region illuminated by means of the headlamps is adjusted so that it ends before or at a crest of the hill. Thus, a special low-beam mode may be produced, which is advantageous since normal low-beam light of the motor vehicle driving up towards the crest might still lead to dazzling of a driver of the other vehicle approaching from the opposite direction when it reaches the crest, because of the angle of inclination of the motor vehicles. The crest of the hill is used as a reference so that the region illuminated by means of the headlamps ends before or at the crest of the hill and illumination therefore does not extend beyond the crest. Such irradiation beyond the crest would moreover serve no purpose for the host driver.

The above objects are furthermore achieved by a motor vehicle having a high-beam assistance system which is configured to carry out the method according to one of the configurations mentioned above or a combination of at least two of these configurations with one another. The advantages mentioned in relation to the method are correspondingly associated with the motor vehicle.

DETAILED DESCRIPTION OF PREFERRED EMBODIMENTS

Figure 1:
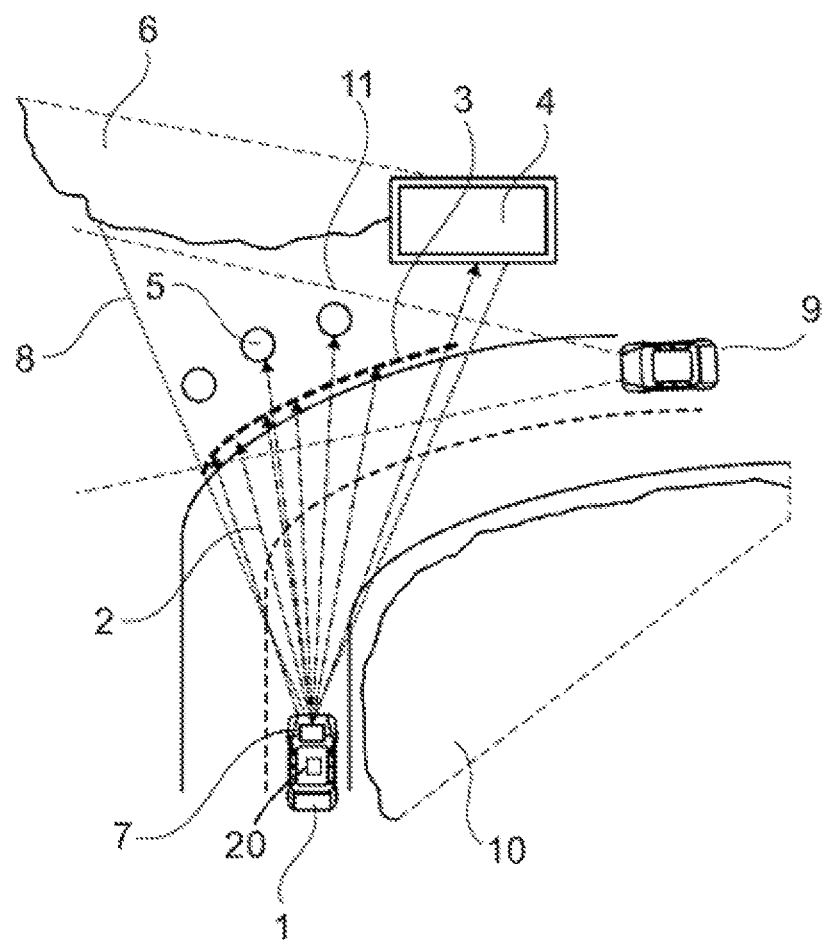
FIG. 1 shows a schematic representation of one exemplary traffic situation with one exemplary embodiment of a motor vehicle according to the invention.

The motor vehicle 1 comprises headlamps (not shown), by means of which a region which is arranged in front of the motor vehicle 1 in a forward driving direction of the motor vehicle 1 during driving of the motor vehicle 1 can be illuminated. The light emerging from the headlamps is indicated by arrows 2 in FIG. 1. For example, this light strikes a guardrail 3, a building 4, and trees 5. Ground which lies behind the trees 5, and which may be overgrown with grass or the like, and a landscape structure 6 lying behind this, may furthermore be illuminated with the light.

The motor vehicle 1 additionally comprises a high-beam assistance system 20, by means of which the headlamps can be selectively brought into a high-beam state or at least a low-beam state.

Furthermore, the motor vehicle 1 comprises a camera 7, by means of which the region illuminated by means of the headlamps can be continuously registered. A field of view 8 of the camera 7, which contains the region illuminated by means of the headlamps, is indicated in FIG. 1. The high-beam assistance system 20 can be operated while taking into account images registered by means of the camera 7.

The motor vehicle 1 is driving towards a right-hand bend. Another vehicle 9, which is not visible to the driver of the motor vehicle 1 since it is concealed by objects 10, for example houses, bushes, trees, a landscape elevation, or the like, is approaching the motor vehicle 1 from the opposite direction. The other vehicle 9 is also located outside a field of view of the camera 7. The other vehicle 9 comprises headlamps (not shown), which are switched on and therefore generate illumination 11.

The high-beam assistance system 20 of the motor vehicle 1 is configured to electronically determine whether at least one illumination information item, which results not from the illumination of the region by means of the headlamps of the motor vehicle 1 but from the illumination of the region by means of the headlamps of the other vehicle 9, is contained in the images registered by means of the camera 7.

In this case, the high-beam assistance system of the motor vehicle 1 may be configured to electronically determine whether a light color is contained in the images registered by means of the camera 7 which does not match a light color generated by means of the headlamps of the motor vehicle 1.

As an alternative or in addition, the high-beam assistance system 20 of the motor vehicle 1 may be configured to electronically determine whether a movement of pixels, which is determined from the images registered by means of the camera 7, deviates from a setpoint movement of pixels which is to be expected on the basis of a movement of the motor vehicle 1. To this end, the high-beam assistance system 20 of the motor vehicle 1 may be configured to electronically determine the movement of the motor vehicle 1 by means of a vehicle sensor system, and/or to electronically determine the setpoint movement of the pixels from the movement of the motor vehicle 1.

As an alternative or in addition, the high-beam assistance system 20 of the motor vehicle 1 may be configured to electronically determine whether a brightness existing outside the region illuminated by means of the headlamps of the motor vehicle 1 exceeds a predetermined brightness limit value. In this case, the high-beam assistance system 20 of the motor vehicle 1 may be configured to vary the brightness limit value as a function of an ambient brightness.

As an alternative or in addition, the high-beam assistance system 20 of the motor vehicle 1 may be configured to electronically determine whether a brightness of the region illuminated by means of the headlamps of the motor vehicle 1 changes.

As an alternative or in addition, the high-beam assistance system 20 of the motor vehicle 1 may be configured to electronically determine whether illumination of an object 3, 4, 5 or 6, which is registered by means of the camera 7 and is arranged in the region illuminated by means of the headlamps of the motor vehicle 1, deviates from an expected illumination of the object 3, 4, 5 or 6 by means of the headlamps of the motor vehicle 1.

As an alternative or in addition, the high-beam assistance system 20 of the motor vehicle 1 may be configured to electronically determine whether the motor vehicle 1 is driving up a hill, and then, if at least one illumination information item, which does not result from the illumination of the region by means of the headlamps of the motor vehicle 1, is contained in the images registered by means of the camera 7, to operate the headlamps of the motor vehicle 1 in such a way that the region illuminated by means of the headlamps ends before or at a crest of the hill.

Figure 2:
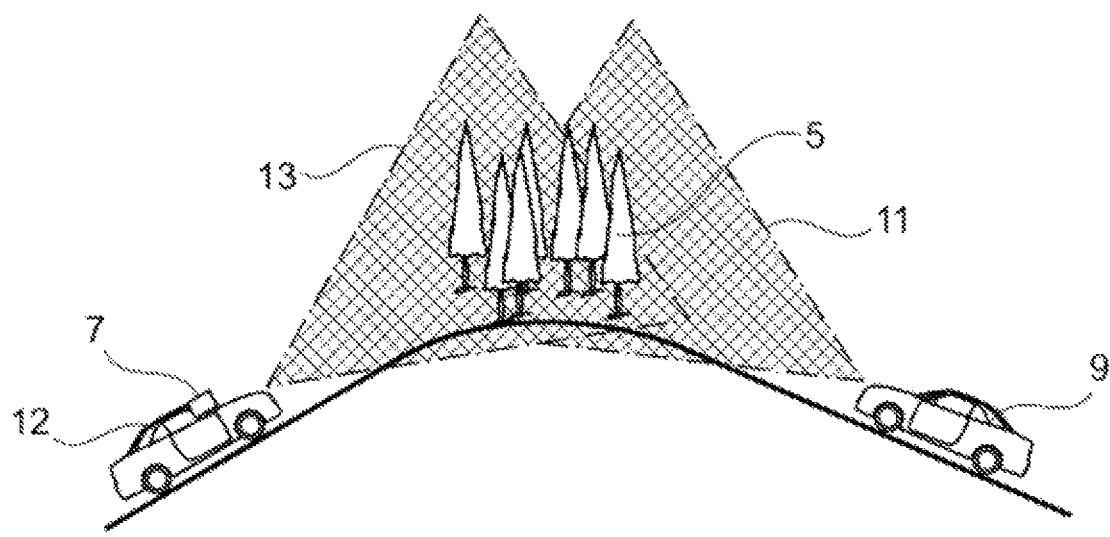
FIG. 2 shows a schematic representation of a further exemplary traffic situation with a further exemplary embodiment of a motor vehicle according to the invention.

FIG. 2 shows a schematic representation of a further exemplary traffic situation with a further exemplary embodiment of a motor vehicle 12 according to the invention.

The motor vehicle 12 comprises headlamps (not shown), by means of which a region which is arranged in front of the motor vehicle 12 in a forward driving direction of the motor vehicle 12 during driving of the motor vehicle 12 can be illuminated. The light emerging from the headlamps is indicated by a dot-and-dash line 13 in FIG. 2. Inter alia, this light strikes objects 5 in the form of trees.

The motor vehicle 12 additionally comprises a high-beam assistance system (not shown), by means of which the headlamps can be selectively brought into a high-beam state or at least one low-beam state.

Furthermore, the motor vehicle 12 comprises a camera 7, by means of which the region illuminated by means of the headlamps can be continuously registered. The high-beam assistance system can be operated while taking into account images registered by means of the camera 7.

The motor vehicle 12 is driving up a hill. Another vehicle 9, which is not visible to the driver of the motor vehicle 12 since it is concealed by the hill, is approaching the motor vehicle 12 from the opposite direction. The other vehicle 9 is also located outside a field of view of the camera 7. The other vehicle 9 comprises headlamps (not shown), which are switched on and therefore generate illumination 11.

The high-beam assistance system of the motor vehicle 12 is configured to electronically determine whether at least one illumination information item, which results not from the illumination of the region by means of the headlamps of the motor vehicle 12 but from the illumination of the region by means of the headlamps of the other vehicle 9, is contained in the images registered by means of the camera 7.

The high-beam assistance system of the motor vehicle 12 is configured to electronically determine whether the motor vehicle 12 is driving up a hill, and then, if at least one illumination information item, which does not result from the illumination of the region by means of the headlamps of the motor vehicle 12, is contained in the images registered by means of the camera 7, to then adjust operation the headlamps of the motor vehicle 12 in such a way that the region illuminated by means of the headlamps ends before or at a crest of the hill.

The high-beam assistance system of the motor vehicle 12 may be configured to electronically determine whether a light color which does not match a light color generated by means of the headlamps of the motor vehicle 12 is contained in the images registered by means of the camera 7.

As an alternative or in addition, the high-beam assistance system of the motor vehicle 12 may be configured to electronically determine whether a movement of pixels, which is determined from the images registered by means of the camera 7, deviates from a setpoint movement of pixels which is to be expected on the basis of a movement of the motor vehicle 12. To this end, the high-beam assistance system of the motor vehicle 12 may be configured to electronically determine the movement of the motor vehicle 12 by means of a vehicle sensor system, and/or to electronically determine the setpoint movement of the pixels from the movement of the motor vehicle 12.

As an alternative or in addition, the high-beam assistance system of the motor vehicle 12 may be configured to electronically determine whether a brightness existing outside the region illuminated by means of the headlamps of the motor vehicle 12 exceeds a predetermined brightness limit value. In this case, the high-beam assistance system of the motor vehicle 12 may be configured to vary the brightness limit value as a function of an ambient brightness.

As an alternative or in addition, the high-beam assistance system of the motor vehicle 12 may be configured to electronically determine whether a brightness of the region illuminated by means of the headlamps of the motor vehicle 12 changes.

As an alternative or in addition, the high-beam assistance system of the motor vehicle 12 may be configured to electronically determine whether illumination of an object 5 which is registered by means of the camera 7 and is arranged in the region illuminated by means of the headlamps of the motor vehicle 12 deviates from an expected illumination of the object 5 by means of the headlamps of the motor vehicle 12.

What is claimed is:

1. A method for operating a high-beam assistance system of a host motor vehicle, wherein a region in front of the host motor vehicle including a roadway is illuminated by host headlamps of the host motor vehicle, the method comprising the steps of:
registering images of the region using at least one camera mounted in the host motor vehicle, wherein the registered images do not include any approaching vehicle on the roadway;
determining an expected illumination information item which is estimated to result from illumination by the host headlamps;
determining an actual illumination information item contained in the registered images;
comparing the expected illumination information item and the actual illumination information item; and
adjusting an illumination provided by the host headlamps according to approach of an oncoming vehicle if the actual illumination information item deviates from the expected illumination information item.

2. The method of claim 1 wherein the expected illumination information item is precalculated using stored parameters or measured parameters of the host motor vehicle.

3. The method of claim 1 wherein the illumination information item is comprised of a color of light, and wherein a deviation of an expected color of light generated by the host headlamps from an actual color of light contained in the images registered by the at least one camera is electronically determined.

4. The method of claim 1 wherein the illumination information item is comprised of a movement of pixels, and wherein a deviation of an expected setpoint movement of pixels based on the basis of a movement of the host motor vehicle from an actual movement of pixels contained in the images registered by the at least one camera is electronically determined.

5. The method of claim 4 wherein the expected setpoint movement is electronically determined by a vehicle sensor system.

6. The method of claim 1 wherein the adjusting step is performed if a brightness in the registered images existing outside the region illuminated by the host headlamps exceeds a predetermined brightness limit value.

7. The method of claim 6 wherein the brightness limit value is varied as a function of an ambient brightness.

8. The method of claim 1 further comprising the step of:
detecting whether the host motor vehicle is driving up a hill;
wherein the adjusting step further comprises operating the host headlamps such that the region illuminated by the host headlamps ends before or at a crest of the hill.

9. A host motor vehicle comprising:
host headlamps illuminating a region in front of the host motor vehicle including a roadway;
a high-beam assistance system selectively adjusting the host headlamps into a high-beam state or at least one low-beam state; and
at least one camera registering images of the region;
wherein when the registered images do not include any approaching vehicle on the roadway, then the high-beam assistance system A) determines an expected illumination information item which is estimated to result from illumination by the host headlamps, B) determines an actual illumination information item contained in the registered images, C) compares the expected illumination information item and the actual illumination information item, and D) adjusts an illumination provided by the host headlamps to the low-beam state if the actual illumination information item deviates from the expected illumination information item.

10. The motor vehicle of claim 9 wherein the expected illumination information item is precalculated using stored parameters or measured parameters of the host motor vehicle.

11. The motor vehicle of claim 9 wherein the illumination information item is comprised of a color of light, and wherein a deviation of an expected color of light generated by the host headlamps from an actual color of light contained in the images registered by the at least one camera is electronically determined.

12. The motor vehicle of claim 9 wherein the illumination information item is comprised of a movement of pixels, and wherein a deviation of an expected setpoint movement of pixels based on the basis of a movement of the host motor vehicle from an actual movement of pixels contained in the images registered by the at least one camera is electronically determined.

13. The motor vehicle of claim 12 wherein the expected setpoint movement is electronically determined by a vehicle sensor system.

14. The motor vehicle of claim 9 wherein the high-beam assistance system sets the host headlamps to the low-beam state if a brightness in the registered images existing outside the region illuminated by the host headlamps exceeds a predetermined brightness limit value.

15. The motor vehicle of claim 14 wherein the brightness limit value is varied as a function of an ambient brightness.

16. The motor vehicle of claim 9 wherein the high-beam assistance system detects whether the host motor vehicle is driving up a hill, and wherein the high-beam assistance system adjusts the host headlamps such that the region illuminated by the low-beam state ends before or at a crest of the hill.

* * * * *